United States Patent
Holmes et al.

(10) Patent No.: US 9,989,975 B2
(45) Date of Patent: Jun. 5, 2018

(54) FLOW ISOLATION FOR BLOWOUT PREVENTER HYDRAULIC CONTROL SYSTEMS

(71) Applicant: Hydril USA Distribution, LLC, Houston, TX (US)

(72) Inventors: John S. Holmes, Houston, TX (US); James Nolan, Houston, TX (US)

(73) Assignee: Hydril USA Distribution, LLC, Houston, TX (US)

(*) Notice: Subject to any disclaimer, the term of this patent is extended or adjusted under 35 U.S.C. 154(b) by 371 days.

(21) Appl. No.: 14/938,074

(22) Filed: Nov. 11, 2015

(65) Prior Publication Data
US 2016/0130905 A1    May 12, 2016

Related U.S. Application Data

(60) Provisional application No. 62/078,236, filed on Nov. 11, 2014.

(51) Int. Cl.
*G05D 7/00*    (2006.01)
*G05D 7/06*    (2006.01)
(Continued)

(52) U.S. Cl.
CPC ........... *G05D 7/0676* (2013.01); *E21B 34/16* (2013.01); *G05B 15/02* (2013.01)

(58) Field of Classification Search
None
See application file for complete search history.

(56) References Cited

U.S. PATENT DOCUMENTS 3,902,554 A    9/1975    Hooper
4,109,938 A    8/1978    Mitchell et al.
(Continued)

FOREIGN PATENT DOCUMENTS

| CN | 201250646 Y | 6/2009 |
| WO | 0001915 A2 | 1/2000 |
| WO | 2013192494 A1 | 12/2013 |

OTHER PUBLICATIONS

McCord, "A Multiplex System for a Small Remotely Manned Submersible", IEEE Ocean 1975, pp. 361-364, 1975.
(Continued)

*Primary Examiner* — Paul Yanchus, III
(74) *Attorney, Agent, or Firm* — Hogan Lovells US LLP

(57) ABSTRACT

Methods and systems for accurately measuring and monitoring accumulated volume of hydraulic fluid in a blowout preventer (BOP) system, specifically for a function of interest, are disclosed. One method includes initializing a state machine algorithm, the state machine algorithm responsive to a BOP function of interest being activated; measuring an initial hydraulic flow rate baseline and an initial pressure baseline to create a hydraulic impedance variable for use in the state machine algorithm; monitoring an aggregate hydraulic flow rate and pressure of the BOP system over time; applying the hydraulic impedance variable to negate BOP system hydraulic flows not related to the BOP function of interest; and applying the state machine algorithm to determine when the BOP function of interest has been completed responsive to a total accumulated volume of hydraulic fluid.

20 Claims, 10 Drawing Sheets

(51) Int. Cl.
*G05B 15/02* (2006.01)
*E21B 34/16* (2006.01)

(56) References Cited

U.S. PATENT DOCUMENTS

| | | | |
|---|---|---|---|
| 4,618,173 | A | 10/1986 | Dopyera et al. |
| 4,709,726 | A | 12/1987 | Fitzgibbons |
| 5,314,024 | A | 5/1994 | Rodgers et al. |
| 5,778,918 | A | 7/1998 | McLelland |
| 5,781,192 | A | 7/1998 | Kodimer |
| 5,867,150 | A | 2/1999 | Bricklin et al. |
| 6,040,969 | A | 3/2000 | Winch et al. |
| 6,041,804 | A | 3/2000 | Chatufale |
| 6,835,292 | B2 | 12/2004 | Sato et al. |
| 6,957,205 | B1 | 10/2005 | Liongosari |
| 6,961,226 | B2 | 11/2005 | Mason, Jr. et al. |
| 6,990,498 | B2 | 1/2006 | Fenton et al. |
| 7,000,890 | B2 | 2/2006 | Bell et al. |
| 7,111,874 | B2 | 9/2006 | Smith, III |
| 7,113,668 | B2 | 9/2006 | Sorum et al. |
| 7,216,715 | B2 | 5/2007 | Reynolds |
| 7,261,162 | B2 | 8/2007 | Deans et al. |
| 7,337,848 | B2 | 3/2008 | Fraser et al. |
| 7,558,684 | B2 | 7/2009 | Patten et al. |
| 7,571,772 | B2 | 8/2009 | Reams |
| 7,760,670 | B2 | 7/2010 | Causier |
| 7,832,706 | B2 | 11/2010 | Judge |
| 7,849,599 | B2 | 12/2010 | Huff et al. |
| 7,887,103 | B2 | 2/2011 | Evans et al. |
| 7,913,767 | B2 | 3/2011 | Larson et al. |
| 7,975,770 | B2 | 7/2011 | Keener |
| 8,020,623 | B2 | 9/2011 | Parks et al. |
| 8,054,593 | B2 | 11/2011 | Reid et al. |
| 8,157,025 | B2 | 4/2012 | Johnson |
| 8,157,295 | B2 | 4/2012 | Krywitsky |
| 8,230,735 | B2 | 7/2012 | Chouzenoux et al. |
| 8,322,436 | B2 | 12/2012 | Maa |
| 8,388,255 | B2 | 3/2013 | Larson et al. |
| 8,403,053 | B2 | 3/2013 | Judge |
| 8,464,797 | B2 | 6/2013 | Singh et al. |
| 8,469,048 | B2 | 6/2013 | Bresnahan |
| 8,602,108 | B2 | 12/2013 | Mathis |
| 8,708,054 | B2 | 4/2014 | Dailey, Jr. |
| 8,724,957 | B2 | 5/2014 | Oisel et al. |
| 8,781,743 | B2 | 7/2014 | McKay et al. |
| 8,812,274 | B2 | 8/2014 | Virkar et al. |
| 8,944,403 | B2 | 2/2015 | Jurena et al. |
| 9,057,751 | B2 | 6/2015 | Spencer et al. |
| 9,085,948 | B2 | 7/2015 | Egeland |
| 9,151,794 | B2 | 10/2015 | Radan |
| 2010/0300696 | A1 | 12/2010 | McCalvin et al. |
| 2011/0098946 | A1 | 4/2011 | Curtiss, III |
| 2011/0100136 | A1* | 5/2011 | Chouzenoux .......... G01F 1/44 73/861.63 |
| 2011/0266002 | A1 | 11/2011 | Singh et al. |
| 2012/0233128 | A1 | 9/2012 | Solmer |
| 2012/0312546 | A1 | 12/2012 | Bussear et al. |
| 2012/0318517 | A1 | 12/2012 | Christensen et al. |
| 2013/0054034 | A1 | 2/2013 | Ebenezer |
| 2013/0118755 | A1 | 5/2013 | Kotrla et al. |
| 2013/0253872 | A1 | 9/2013 | Curtis et al. |
| 2013/0255956 | A1 | 10/2013 | Gilmore et al. |
| 2013/0283919 | A1 | 10/2013 | Coonrod et al. |
| 2014/0061516 | A1 | 3/2014 | Gustafson et al. |
| 2014/0064029 | A1 | 3/2014 | Jaffrey |
| 2014/0311735 | A1 | 10/2014 | Landrith, II et al. |
| 2014/0321341 | A1 | 10/2014 | Kristiansen |
| 2014/0361785 | A1 | 12/2014 | Radan |
| 2015/0015066 | A1 | 1/2015 | Dong et al. |
| 2015/0041122 | A1 | 2/2015 | Valsecchi |
| 2015/0101674 | A1 | 4/2015 | Gustafson |
| 2015/0129233 | A1 | 5/2015 | Gaude et al. |
| 2015/0184505 | A1 | 7/2015 | Panicker-Shah |
| 2015/0198001 | A1 | 7/2015 | McWhorter et al. |
| 2015/0233202 | A1 | 8/2015 | Caldwell et al. |
| 2015/0260203 | A1 | 9/2015 | Launonen et al. |

OTHER PUBLICATIONS

Hickok, "Practical Experience of Control Valve Behavior", Subsea Control and Data Acquisition: Proceedings of an international conference, London, UK, pp. 195-203, Apr. 4-5, 1990.

Ali et al., "Subsea Valve Actuator for Ultra Deepwater", Offshore Technology Conference, Houston, Texas, 1996 proceedings, pp. 799-809, May 6-9, 1996.

Altamiranda et al., "Intelligent Supervision and Integrated Fault Detection and Diagnosis for Subsea Control Systems", OCEANS 2007 Europe, pp. 1-6, Jun. 18-21, 2007.

Wang et al., "Water Hammer Effects on Water Injection Well Performance and Longevity", Society of Petroleum Engineers, SPE International Symposium and Exhibition on Formation Damage Control,Lafayette, Louisiana, USA, pp. 1-10, Feb. 13-15, 2008.

Vetcogray, "Capital Drilling Equipment", retrieved from http://site.ge-energy.com/businesses/ge_oilandgas/en/literature/en/downloads/capital_drilling_equipment.pdf, pp. 1-15, 2008.

Altamiranda et al., "Condition Monitoring and Diagnosis for Subsea Control Systems. A Subsystem Prototype", OCEANS 2009 EUROPE, pp. 1-6, May 11-14, 2009.

Whitby et al., "20KSI BOP Stack Development", SPE International, pp. 1-5, Feb. 2-4, 2010.

Tang et al., "A Dynamic Simulation Study of Water Hammer for Offshore Injection Wells to Provide Operation Guidelines", SPE Production & Operations, vol. No. 25, Issue No. 4, pp. 509-523, Nov. 2010.

Shanks et al., "OTC 23473 New Generation Control System for 20 KSI Subsea BOP", Offshore Technology Conference, pp. 1-12, May 3, 2012.

Levine et al., "BSEE and BOEM Workshop with Government of Israel Application for Permit to Drill", pp. 1-40, Jul. 24, 2012.

Cai et al., "Reliability Analysis of Subsea Blowout Preventer Control Systems Subjected to Multiple Error Shocks", Journal of Loss Prevention in the Process Industries, vol. No. 25, Issue No. 6, pp. 1044-1054, Nov. 1, 2012.

Cai et al., "Application of Bayesin Networks to Reliability Evaluation of Software Systems for Subsea Blowout Preventers", International Journal of Control and Automation, pp. 47-60, Feb. 28, 2013.

Umofia., "Risk-Based Reliability Assessment of Subsea Control Module for Offshore Oil and Gas production", Cranfield University, School of Engineering, Department of Offshore, Process and Energy Engineering, pp. 1-284, Sep. 2014.

PCT Search Report and Written Opinion issued in connection with Related Application No. PCT/US2015/053238 dated Feb. 1, 2016.

PCT Search Report and Written Opinion issued in connection with Related Application No. PCT/US2015/055915 dated Feb. 2, 2016.

GE Oil & Gas, "GE's 20-ksi" BOP Completely Re-Engineered to Meet Demands of HPHT Reservoirs, Drilling Contractor, pp. 1-2, Feb. 17, 2016.

Cameron., "Mark III Subsea MUX BOP Control System", Drilling Pressure Control Equipment, retrieved from http://www.c-a-m/com/products-and-services/drilling/drilling-pressure-control-equipment/mark-iii-subsea-mux-bop-control-system, pp. 1-4, Feb. 19, 2016.

John S. Holmes et al., U.S. Appl. No. 14/870,249, filed Sep. 30, 2015.

John Steven Holmes et al., U.S. Appl. No. 14/884,563, filed Oct. 15, 2015.

Alex David Stibich et al., U.S. Appl. No. 14/963,849, filed Dec. 9, 2015.

Glen Allen Scott et al., U.S. Appl. No. 14/972,848, filed Dec. 17, 2015.

Michael James Connor et al., U.S. Appl. No. 14/971,381, filed Dec. 16, 2015.

William James Hatter et al., U.S. Appl. No. 14/972,266, filed Dec. 17, 2015.

Thomas David Beales et al., U.S. Appl. No. 14/971,669, filed Dec. 16, 2015.

Thomas David Beales et al., U.S. Appl. No. 14/971,305, filed Dec. 16, 2015.

(56) References Cited

OTHER PUBLICATIONS

Alexander Michael Mcauley et al., U.S. Appl. No. 14/938,599, filed Nov. 11, 2015.
PCT Search Report and Written Opinion issued in connection with Corresponding Application No. PCT/US2015/060395 dated Apr. 21, 2016.
D.Chazal, et al., Enhancements in Fraction Measurements and Flow Modeling for Multiphase Flowmeters, SPE Annual Technical Conference and Exhibition, Amsterdam, NL, Oct. 27-29, 2014.
W.W. Martin, et al., A Proven Oil/Water/Gas Flowmeter for Subsea, Offshore Technology Conference, Houston, TX May 6, 1991.

\* cited by examiner

FLOW ISOLATION FOR BLOWOUT PREVENTER HYDRAULIC CONTROL SYSTEMS

RELATED APPLICATIONS

This application is a non-provisional application claiming priority to U.S. Provisional Application No. 62/078,236, filed Nov. 11, 2014, which is hereby incorporated herein by reference in its entirety. U.S. application Ser. No. 14/884,563 was filed on Oct. 15, 2015 and claims priority to U.S. Provisional Application No. 62/065,431, filed Oct. 17, 2014, the entire disclosures of which are both hereby incorporated herein by reference.

BACKGROUND

1. Field of Invention

This disclosure relates in general to oil and gas equipment, and in particular to a method of measuring flow to determine if hydraulic controls have acted to carry out a specific function. In particular, the disclosure provides systems and methods to monitor aggregated flow rates and pressures in hydraulic control systems to realize information about a specific load of interest.

2. Related Technology

Blowout preventer (BOP) systems are hydraulically-controlled systems used to prevent blowouts from subsea oil and gas wells. Subsea BOP equipment typically includes a set of two or more redundant control systems with separate hydraulic pathways to operate a specified BOP function on a BOP stack. The redundant control systems are commonly referred to as blue and yellow control pods. In known systems, a communications and power cable sends information and electrical power to an actuator with a specific address. The actuator in turn moves a hydraulic valve, thereby opening a fluid path to a series of other valves/piping to control a portion of the BOP.

One deficiency with current BOP systems is that hydraulic fluid communication from the surface is made through a pair of redundant conduits with fluid supplied from a single source with limited measuring means, oftentimes a single flow meter. When there are multiple, separate control systems at the sea surface utilizing a common hydraulic supply to feed subsea components, the multiple, separate control systems on the surface may not accurately realize what functions have been carried out by another control system based on a common measurement device, such as a common flow meter or common pressure meter. For example, a primary surface control system used to execute functions by feeding hydraulics to subsea components may not accurately convey to a backup safety system the executed functions when the systems have a common flow meter.

In known systems, measuring the fluid going to a specific load is difficult when the system has two or more independent control systems which are utilizing a single hydraulic source. Adding additional flow meters and pressure meters can complicate systems and introduce other deficiencies.

SUMMARY

Embodiments of systems and methods of the disclosure allow monitoring of a flow meter on a system with multiple control systems and isolation of how much flow goes to a specific load. Embodiments of the method enable synchronization of an initial activation of a load and an initial read signal. Monitoring of a flow meter is used to isolate noise signals in the flow meter and filter the flow rate going to the intended load in a system with multiple control systems.

Systems and methods of the present disclosure enable the use of a common hydraulic power system and flow meter for multiple control systems. Systems and methods of the present disclosure substantially improve the analytical capability of a BOP system and allow improved diagnostics and safety with a minimal number of additional sensors.

Disclosed herein is a method for accurately measuring and monitoring accumulated volume of hydraulic fluid in a blowout preventer (BOP) system. The method includes the steps of initializing a state machine algorithm, the state machine algorithm responsive to a BOP function of interest being activated and measuring an initial hydraulic flow rate baseline and an initial pressure baseline to create a hydraulic impedance variable for use in the state machine algorithm. In some embodiments, the method further includes the steps of monitoring an aggregate hydraulic flow rate and pressure of the BOP system over time and applying the hydraulic impedance variable to negate BOP system hydraulic flows not related to the BOP function of interest. In some embodiments, the method further includes the step of applying the state machine algorithm to determine when the BOP function of interest has been completed responsive to a total accumulated volume of hydraulic fluid.

Also disclosed herein is a system for accurately measuring and monitoring accumulated volume of hydraulic fluid in a blowout preventer (BOP) function of interest. The system includes surface hydraulics components, the surface hydraulics components comprising a hydraulic power unit (HPU) and at least two control systems, the at least two control systems fluidly coupled to the HPU and independently operable to cause flow of a hydraulic fluid from the HPU; subsea BOP components, the subsea BOP components comprising a BOP stack, wherein the BOP stack comprises BOP stack functions that are operable to be carried out by the flow of the hydraulic fluid from the HPU; and a fluid flow meter disposed between the HPU and the BOP stack on a rigid conduit, the fluid flow meter operable to measure an aggregate flow of hydraulic fluid from the HPU to the BOP stack.

In some embodiments, the system further includes a pressure meter disposed on or proximate the HPU, the HPU feeding the rigid conduit with hydraulic fluid, the pressure meter operable to measure line pressure of the aggregate flow of the hydraulic fluid from the HPU to the BOP stack and a processing unit, including a processor, operable to receive aggregate fluid flow data from the fluid flow meter and line pressure data from the pressure meter. The processing unit is in communication with and includes non-transitory, tangible memory medium in communication with the processor having a set of stored instructions, the set of stored instructions being executable by the processor and including the steps of: initializing a state machine algorithm, the state machine algorithm responsive to the BOP function of interest being activated; applying a measured initial hydraulic flow rate baseline and an initial pressure baseline to create a hydraulic impedance variable for use in the state machine algorithm; monitoring the aggregate flow of hydraulic fluid from the HPU to the BOP stack and the line pressure of the aggregate flow of the hydraulic fluid from the HPU to the BOP stack over time; applying the hydraulic impedance variable to negate BOP system hydraulic flows not related to the BOP function of interest; and applying the state machine algorithm to determine when the BOP function of interest has been completed responsive to a total accumulated volume of hydraulic fluid.

Additionally disclosed is an apparatus comprising a tangible, non-transitory memory medium having a set of instructions stored thereon which when executed by a suitable processing unit cause the processing unit to perform a method comprising the steps of: initializing a state machine algorithm, the state machine algorithm responsive to the BOP function of interest being activated; applying a measured initial hydraulic flow rate baseline and an initial pressure baseline to create a hydraulic impedance variable for use in the state machine algorithm; monitoring the aggregate flow of hydraulic fluid from the HPU to the BOP stack and the line pressure of the aggregate flow of the hydraulic fluid from the HPU to the BOP stack over time; applying the hydraulic impedance variable to negate BOP system hydraulic flows not related to the BOP function of interest; and applying the state machine algorithm to determine when the BOP function of interest has been completed responsive to a total accumulated volume of hydraulic fluid.

DETAILED DESCRIPTION OF THE DISCLOSURE

The methods and systems described are for use with components of a subsea BOP system, and provide the ability to determine the flow going to a Safety Integrity Level (SIL) rated load or a basic process control system (BPCS) function (a function of interest) when the BPCS can switch loads on and off from the same hydraulic source asynchronously. Systems and methods of the present disclosure eliminate flow noise from leaks in the system, as well as flow noise caused by state switching and switching transients in the BPCS.

Another use for the methods and systems disclosed herein is in a BPCS, such as, for example, a drilling control system, where there is a need to measure flow rates from functions while ignoring the flow from any leaks that are present in the system. Systems and methods can pull the function signals out of the basic noise caused by leaks.

In addition, a more general use of the method disclosed herein includes measuring flow from one control system in an installation where several independent control systems operate functions from a common hydraulic source. Using a logic tree and specific algorithm, systems and methods allow discernment of the signal of concern while ignoring the other independent control systems.

Figure 1:
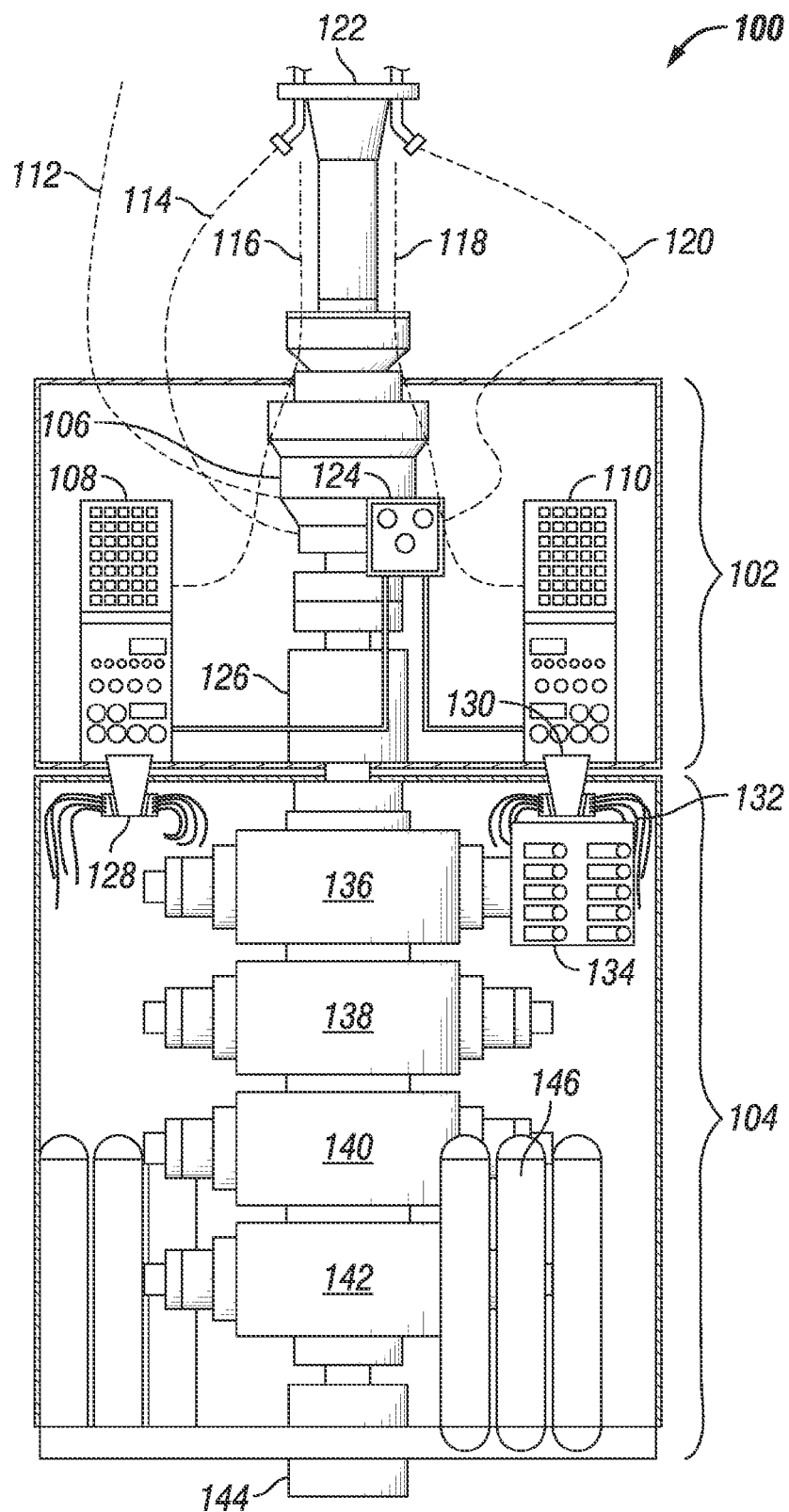
FIG. 1 is a representative system overview of a BOP stack.

Referring first to FIG. 1, a representative system overview of a BOP stack is shown. In FIG. 1, a BOP stack 100 is pictured, which includes a lower marine riser package (LMRP) 102 and a lower stack 104. LMRP 102 includes an annular 106, a blue control pod 108, and a yellow control pod 110. A hotline 112, a blue conduit 114, and a yellow conduit 120 proceed downwardly from a riser 122 into LMRP 102 and through a conduit manifold 124 to control pods 108, 110. A blue power and communications line 116 and a yellow power and communications line 118 proceed to control pods 108, 110, respectively. An LMRP connector 126 connects LMRP 102 to lower stack 104. Hydraulically activated wedges 128 and 130 are disposed to suspend connectable hoses or pipes 132, which can be connected to shuttle panels, such as shuttle panel 134.

Lower stack 104 can include shuttle panel 134, as well as a blind shear ram BOP 136, a casing shear ram BOP 138, a first pipe ram 140, and a second pipe ram 142. BOP stack 100 is disposed above a wellhead connection 144. Lower stack 104 can further include optional stack-mounted accumulators 146 containing a necessary amount of hydraulic fluid to operate certain functions within BOP stack 100.

Figure 2:
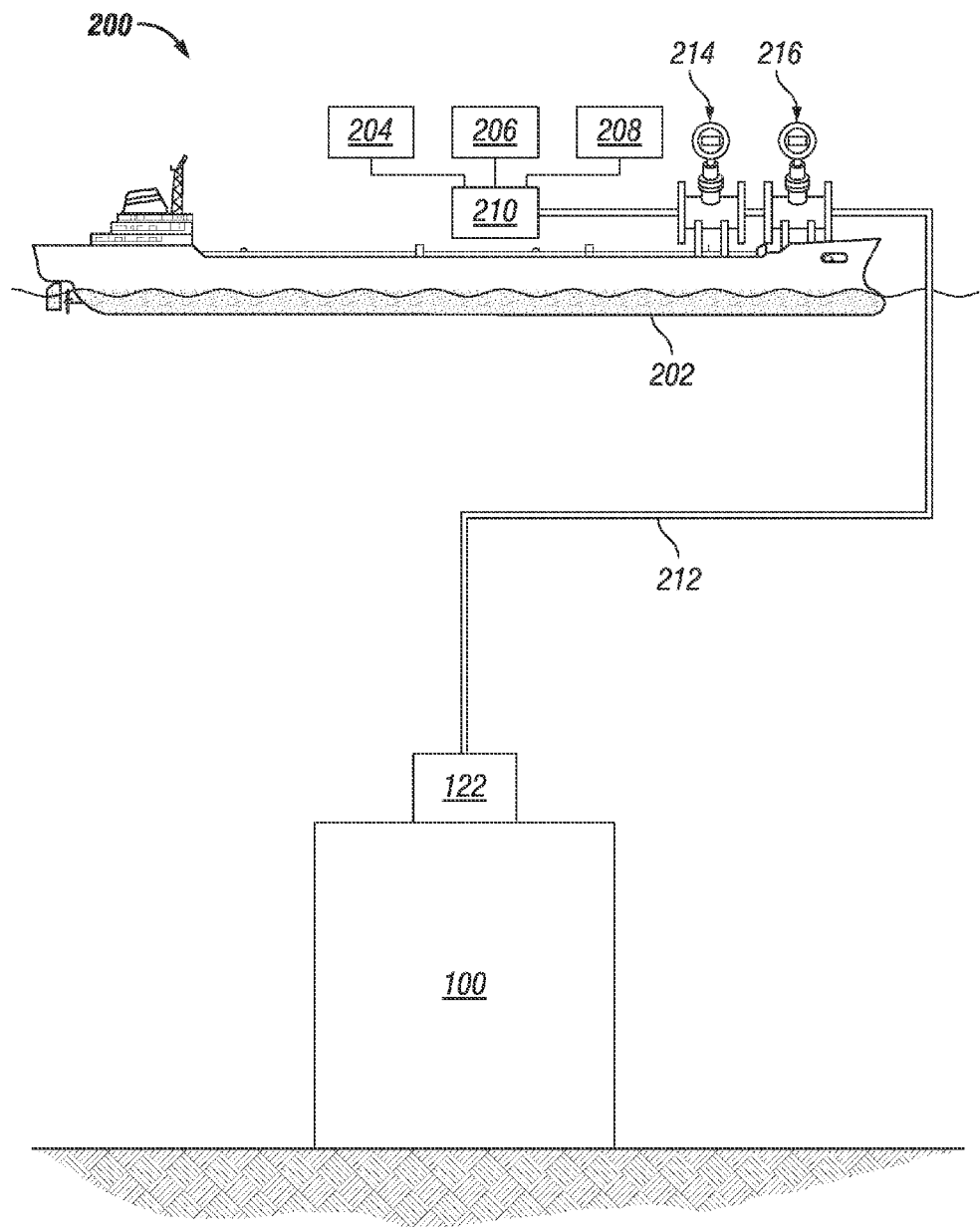
FIG. 2 is a representative system diagram for a BOP system.

Referring now to FIG. 2, a representative system diagram for a BOP system is shown. BOP system 200 includes surface unit 202 and BOP stack 100 with riser 122, also seen in FIG. 1. Surface unit 202 includes separate, independent control systems 204, 206, 208, which are in communication with hydraulic power unit (HPU) 210. When any one of these independent control systems is active, in other words instructing HPU 210 to feed hydraulic fluid (for example from a hydraulic reservoir (not pictured)) and/or electrical current to BOP stack 100, a common conduit 212 is used to provide hydraulic fluid and/or electrical current to BOP stack 100. The hydraulic fluid flow is measured by meter 214. BOP system 200 can also include a common pressure sensor 216. The meters 214, 216 are disposed proximate the surface and proximate HPU 210.

In one example use of BOP system 200, blind shear ram BOP 136 and casing shear ram BOP 138 might need to be activated. Independent control system 204 can provide hydraulic fluid to close blind shear ram BOP 136. However, some of this fluid may leak. In addition, independent control system 204 might fail to provide enough hydraulic fluid to carry out both functions, and might fail to activate casing shear ram BOP 138. In this instance, casing shear ram BOP 138 would need to be activated by independent control system 206 or 208. In this case, the independent control system 206 or 208 would need to know the amount of hydraulic fluid, or load, delivered first by independent control system 204, to carry out either or both functions.

Without the systems and methods of the present disclosure, meter 214 is unable to provide an accurate measure to independent control systems 206, 208 of the functions performed by independent control system 204. An aggregate flow reading is not sufficient to know how much hydraulic fluid has been supplied to carry out individual functions subsea in a BOP stack.

In the systems and methods described, when a function of interest is fired or activated, such as a ram, a state machine, such as state machine system 600 (also referred to as a state machine algorithm herein), clears all internal variables and flags and reads an initial flow rate baseline and an initial pressure baseline. This reading creates a "hydraulic impedance" or head loss variable, which is used to negate any flow due to leaks and/or other functions being executed prior to the function of interest. This variable is also referred to herein as K where K=P/F. F refers to fluid flow and P refers to pressure. The state machine uses the aggregated flow meter, such as meter 214 in FIG. 2, and integrates the flow into a volume. Within the state machine, conditions are monitored that detect changes in flow rate, also referred to herein as dF/dt.

If a large value for dF/dt is detected and a function of interest is not yet complete, the system is re-baselined using the total flow, or in other words the flow to the function of interest and the updated pressure value. In a BOP system, situations in which a large dF/dt is detected and the function is not yet complete can include, in some embodiments, a second function being called to fire before the first function is complete (see FIG. 13, regions B to C) or a hydraulic connection failure, such as, for example, a hose breakage. A logic loop continues until it completes or determines an error state. Error states can include situations such as a given function did not complete or there is too great a volume of hydraulic fluid for a given function. For example, error states might occur when (1) the elapsed time for a function is greater than an expected amount of time, such as, for example, 45 seconds, (2) the volume is greater than or equal to the required function volume, or (3) the function of interest is deactivated.

Figure 3:
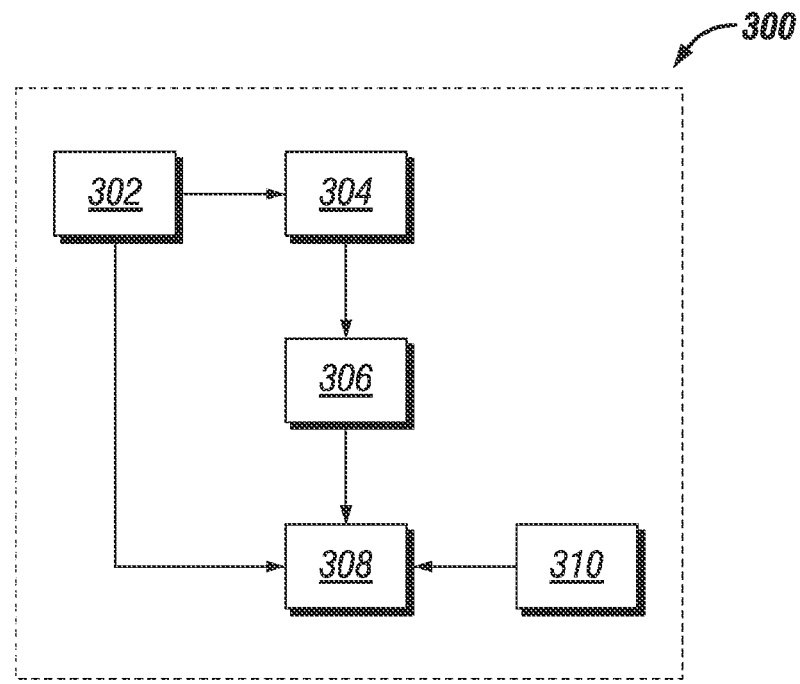
FIG. 3 is a flow chart showing one embodiment of a top level system diagram for systems and methods of the present disclosure.

Referring now to FIG. 3, a flow chart showing one embodiment of a top level system diagram is provided. While experiments and simulations of the present disclosure were programmed, run, and verified using the MATLAB® computer program, one of ordinary skill in the art will realize the systems and methods disclosed herein can be programmed and run using other software and/or hardware, such as, for example, a Siemens® programmable logic controller.

Referring now to FIG. 3, a flow chart showing one embodiment of a top level system diagram is provided. In system 300, at step 302, a complete subsystem model of surface hydraulics is provided (see for example independent control systems 204, 206, 208 in FIG. 2). Step 302 is further described with regards to FIG. 4 below. At step 304, a subsystem model is provided modeling a hydraulic leak, a function of interest, and an unexpected function executing during the expected function (i.e. the function of interest). Step 304 is further described with regard to FIG. 5 below.

At step 306, hardware timers and signals that are required components of a state machine are defined. In some embodiments, step 306 includes defining internal computer and/or programmable logic controller components and/or stand-alone timing mechanisms. At step 308, the state machine is implemented. At step 310, the maximum dF/dt that is acceptable in the system 300 is defined. The maximum dF/dt that is acceptable can be dynamically adjusted to accommodate for the exponential rise of flow resulting from a long pipe (rigid conduit) between surface hydraulics and subsea hydraulics (see FIG. 2, 212). One of ordinary skill in the art will realize additional steps can be used for verification within a simulator, such as for example a simulator for system 300.

Figure 4:
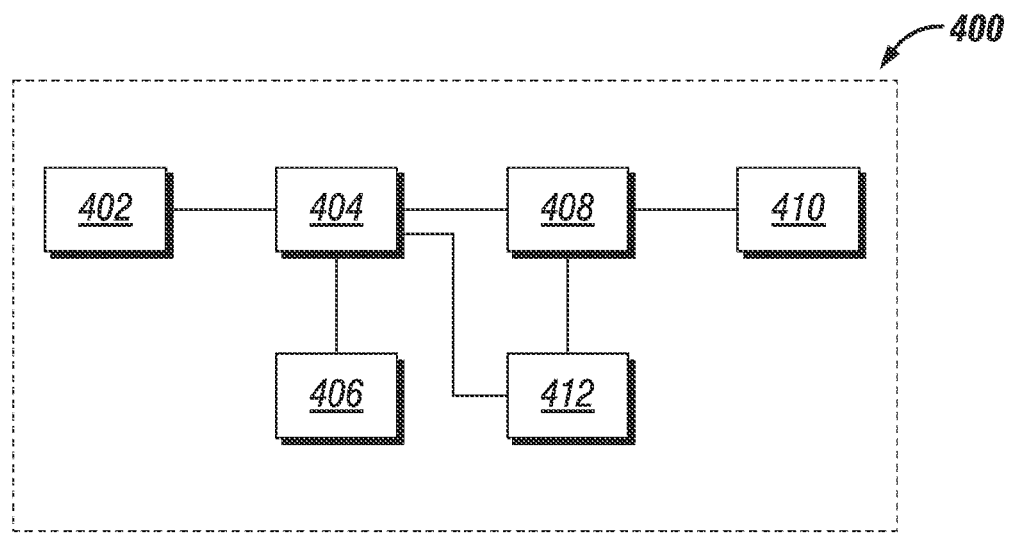
FIG. 4 is a flow chart showing one embodiment of a surface hydraulics simulation.

Referring now to FIG. 4, a flow chart showing one embodiment of a surface hydraulics simulation is provided. System 400 further defines step 302 discussed in reference to FIG. 3. At step 402, a functional model of an HPU is provided using a simple reservoir as an equivalent circuit, such as, for example, HPU 210 in FIG. 2. At step 404, a hydraulic flow sensor, optionally measuring flow in GPM, is represented. At step 406, a total flow rate, optionally in GPM, coming from an HPU skid model is calculated. Steps 404 and 406 represent a flow meter. One physical embodiment of steps 404 and 406 is a fluid flow meter.

At step 408, a hydraulic pressure sensor is provided. At step 410, the pressure meter of the system 400 between the piping from the HPU and a rigid conduit is used to create a "pressure transducer." Steps 408 and 410 together represent a pressure transmitter. Once again, step 402 represents an HPU. At step 412, a model of a rigid conduit is provided, such as conduit 212 in FIG. 2. In some embodiments, up to two miles of rigid conduit can be used between surface and subsea components of BOP systems, and any potential length of conduit can be accurately modeled. One of ordinary skill in the art will realize additional steps can be used for verification within a simulator, such as, for example, a simulator for system 400.

Figure 5:
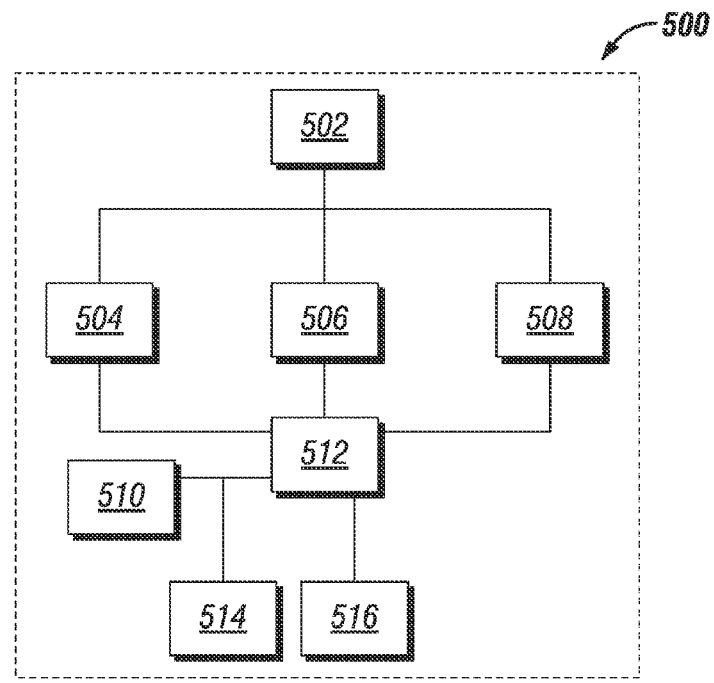
FIG. 5 is a flow chart showing one embodiment of a subsea hydraulics simulation.

Referring now to FIG. 5, a flow chart showing one embodiment of a subsea hydraulics simulation is provided. System 500 further defines step 304 discussed in reference to FIG. 3. At step 502, hydraulic fluid from the surface hydraulics simulation shown in FIG. 4 is provided to the system 500. Blocks 504, 506, 508 represent a BPCS function, a safety integrity level (SIL) function, and a leak flow, respectively. These blocks represent similar functions; however, in block 504 the BPCS sync signal is unique, and in block 508, which is representing a leak, a lower flow rate is used to represent a leak rather than a desired function.

At step 510, a signal that represents a repeating sequence is simulated and this opens and closes a gate valve represented at step 512. The gate valve represented at step 512 is the valve that supplies hydraulic fluid to a function of interest in the BOP stack. At step 514, the sync signal for the BPCS is calculated, and this is only applicable to block 504, and is not applicable to blocks 506 and 508. Step 516 represents a pipe that sets a flow rate approximately equal to that required for a BOP stack function. One of ordinary skill in the art will realize additional steps can be used for verification within a simulator, such as, for example, a simulator for system 500.

Figure 6:
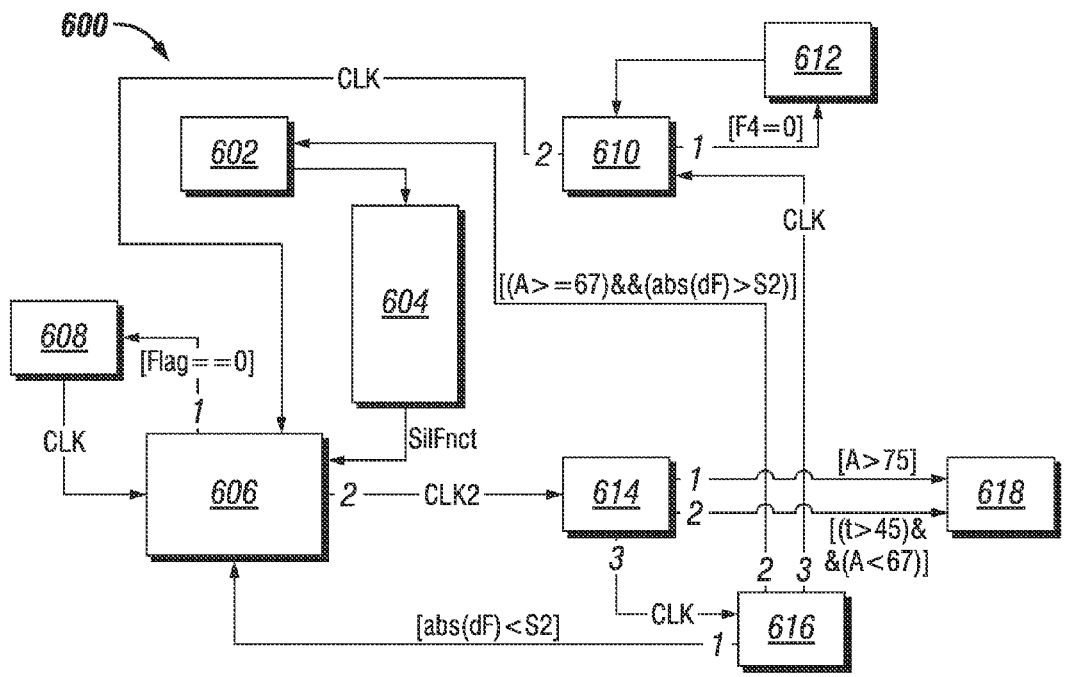
FIG. 6 is a flow chart for a simulation of the systems described in FIGS. 3-5 using a state machine algorithm, also referred to as a state machine system.

Referring now to FIG. 6, a flow chart is provided for a simulation of the systems described in FIGS. 3-5. FIG. 6 provides one embodiment of the functions that could be run in a state-machine algorithm of the present disclosure. In the figures and embodiments described herein, the following abbreviations are applicable: A refers to hydraulic fluid volume accumulated in gallons; F refers to fluid flow; P refers to pressure; FM refers to flow meter measurements from surface hydraulics; PM refers to pressure meter measurements from surface hydraulics; K refers to a "hydraulic impedance" or head loss variable P/F; T refers to time in seconds; Fault refers to a flag to indicate if a fault is detected; S refers to the maximum flow rate allowed by the system; and $S_2$ refers to a compensator that varies S (maximum flow rate allowed by the system) with time. $S_2$ can be adjusted if the product is used with extremely short piping or electronics that do not include capacitors.

Certain subscript numbers indicate a temporary storage location for the variable indicated. For example, $t_2$ is a temporary location used to process time as the loop progresses, or $F_4$ is a location to store a temporary flow rate. The term "SilFnct" is a local representation of the BPCS sync variable described with regard to FIG. 5.

At step 602 in FIG. 6, state machine system 600 is not monitoring flow. At step 604, flow monitoring is initialized with the following functions: entry: A=0;entry: $F_1$=FM; entry: $P_1$=PM; exit: K=$P_1/F_1$; entry: Flag=0; entry: dt=0; entry: t2=0;entry: t=0; entry: Fault=0; entry: $S_2$=5*S; entry: F4=0; and exit: K2=$P_1/F_1$. Step 604 is the initialization state, which sets the starting value of the variables prior to a sync signal. At step 606, flow monitoring is ongoing with the following functions: entry: $F_2$=FM; $P_2$=PM; entry: t=t+1; entry: dt=t−$t_2$; exit: $t_2$=t; exit: A=A+((FM−(PM/K))*dt/60); and exit: $S_2$=S*(1+5^exp(−t/2)). Step 606 for flow monitoring is the main state. During the monitoring state, the flow and pressure meters are monitored and time variables are updated in response to hardware clocks, such as hardware timers and signals at step 306 of FIG. 3. In addition, a totalizer integrates the flow meter and the $S_2$ compensator is calculated over time. At step 608, a store function is carried out with entry: Fi−$F_1$−($P_1$/K) and exit: Flag=1. When the first time in the monitoring step 606 is invoked, step 608 for the store function is executed. Step 608 captures the initial flow that may be due to leaks or other functions.

At step 610, an update function is carried out with the following functions: entry: t=t+1; entry: $K_3$=PM/(FM−$F_4$); and exit: K=($K_2$*$K_3$)/($K_2$+$K_3$). At step 612, a save primary S (maximum flow rate allowed by the system) function is carried out by the following: entry: $F_4$=$F_2$; $P_4$=$P_2$; and entry: t=t-1. At step 614, a loop check is carried out with: exit: dF=FM-$F_2$ and entry: t=t+1.Step 614 calculates the dF/dt used by the loop. If dF/dt is less than $S_2$, which is the GPM, and the function is not complete, then the system returns to the monitoring step 606. If dF/dt is too large, then the process is re-baselined by calculating a new hydraulic impedance variable K in steps 610 and 612. Step 616 is a dummy state.

The dummy state is a temporary state that allows the loop to execute two time cycles without updating variables, providing a synchronizing function between the loop and the physical devices in the system.

Step 618 is a fault state with entry: Fault=1.Step 618 is the point where the state machine system 600 has determined that the function failed. For instance, a fault state may exist where A>75, or in other words the accumulated volume is greater than 75 gallons and a function of interest has not been completed. Or, for example, a fault state may exist where t>45 and A<67, or in other words the elapsed time is greater than 45 seconds and the accumulated volume is still less than 67 gallons after executing a function of interest. This is important because 45 seconds is the American Petroleum Institute (API) required timing to close a BOP and the 67 gallons is the volume required to close a shear ram BOP. One of ordinary skill in the art will realize additional steps can be used for verification within a simulator, such as for example a simulator for system 600.

Figure 7:
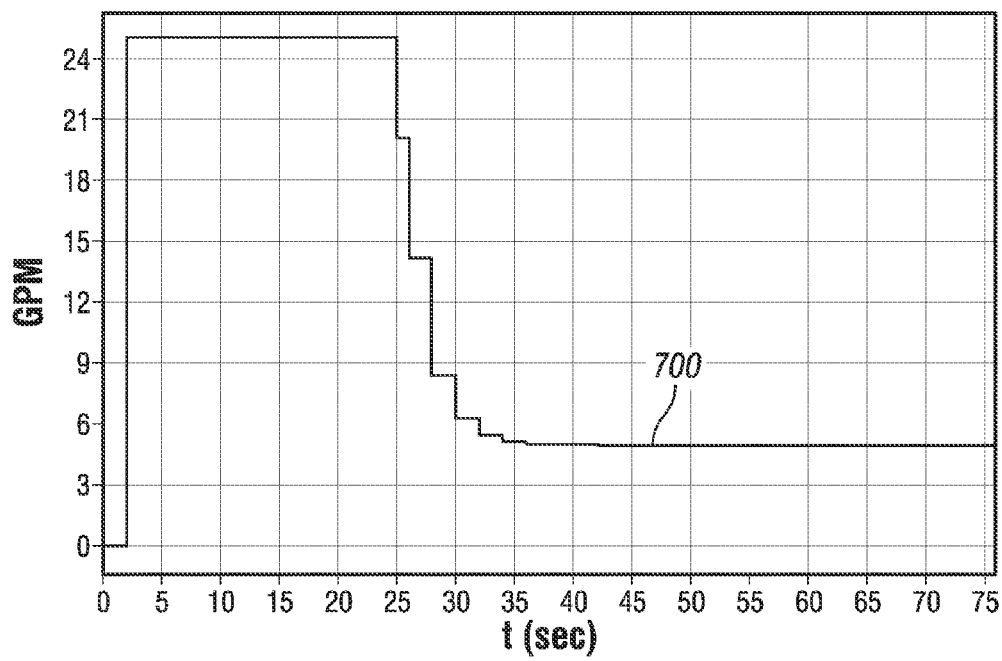
FIG. 7 is a graph representing a flow compensator function ($S_2$) that varies S (max flow rate allowed by a system) with time.

Referring now to FIG. 7, a graph is provided showing a compensator ($S_2$) that varies S (max flow rate allowed by a system) with time. As noted with regard to FIG. 6, S refers to the maximum flow rate allowed by the system and $S_2$ refers to a compensator that varies S (maximum flow rate allowed by the system) with time. $S_2$ may need to be adjusted if the product is used with extremely short piping or electronics that do not include capacitors. $S_2$ compensates for the initial flow. Line 700 shows S, the maximum gallons per minute allowed by the system. The $S_2$ compensator adjusts the maximum allowable flow rate over time to compensate for transient response of the hydraulic system.

Figure 8:
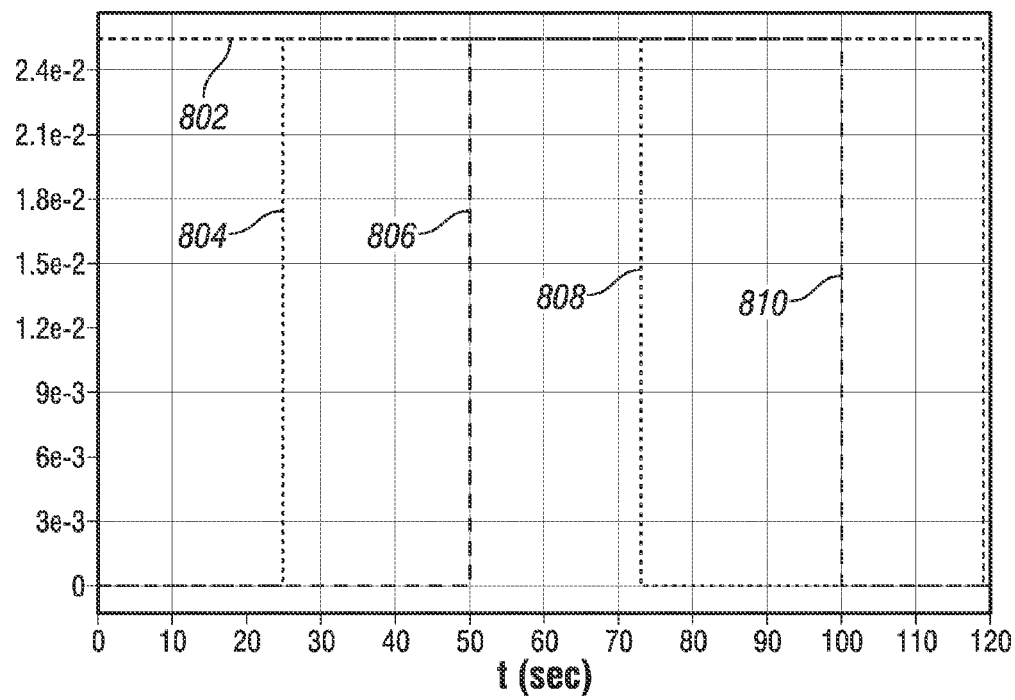
FIG. 8 is a graph showing repeating sequence blocks in the subsea hydraulic system described in FIG. 5.

Referring now to FIG. 8, a graph is provided showing repeating sequence blocks in the subsea hydraulic system described in FIG. 5. Line 802 denotes the modeled "leaks" in the system 500, and the leaks are active and modeled at all times. Line 804 denotes that the BPCS (function of interest) is activated at 25 seconds after the simulation begins. Line 806 denotes that the SIL is active at 50 seconds after the simulation begins. Line 808 denotes that the BPCS has been deactivated to an off state. Line 810 denotes that the SIL has been deactivated to an off state.

Figure 9:
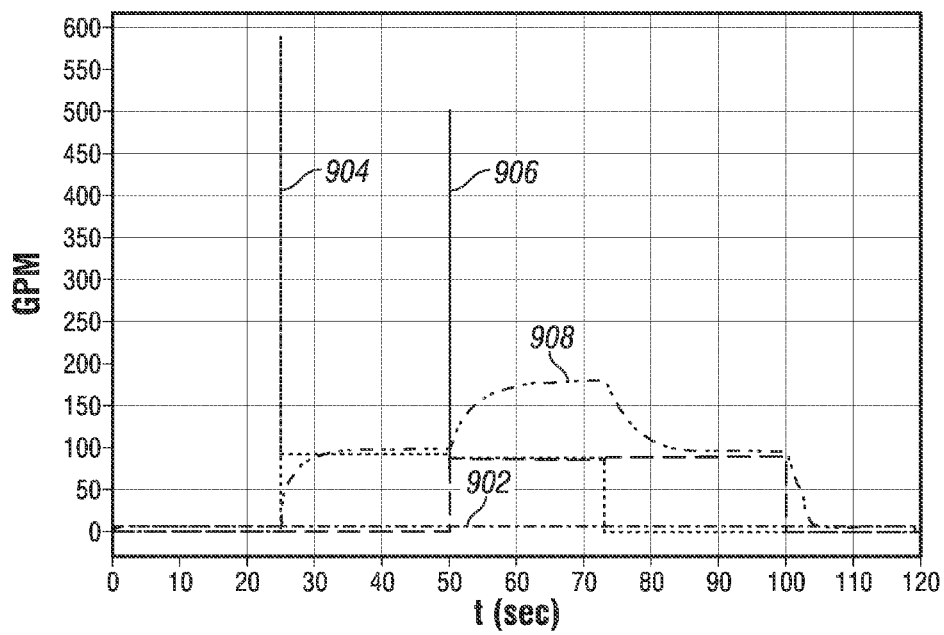
FIG. 9 is a graph representing flows throughout one embodiment of a simulation of a system and method of the present disclosure.

FIG. 9 is a graph representing flows throughout one embodiment of a simulation of a system and method of the present disclosure. In a BOP stack, such as BOP stack 100 represented in FIG. 1, there will be a certain amount of hydraulic leakage when a BOP stack receives hydraulic fluid from a common conduit, such as common conduit 212 in FIG. 2. In FIG. 9, leaks are represented by line 902, a constant amount. The chosen amount for leaks is a decision made when simulating. During validation, many different levels can be tested to ensure the algorithm is robust as to different faults in the system.

At 25 seconds, the BPCS function, represented by line 904, is activated for a hydraulic supply to carry out a function in a BOP stack. Initially, the flow increases quickly to about 600 GPM, and then decreases step-wise back to 0 GPM at about 74 seconds. At 50 seconds, an SIL function, represented by line 906, is activated, which requires additional hydraulic load from the surface. As can be seen, the SIL flow initially increases quickly to about 500 GPM, and then it decreases to 0 GPM at about 100 seconds.

Still referring to FIG. 9, line 908 represents the total flow rate measured from the surface to a BOP stack. Line 908 represents the sum of the flows of lines 902 (leaks), line 904 (function of interest), and line 906 (an SIL function). In a BOP system, such as BOP system 200, the total flow rate registered on the surface, such as by meter 214 (represented in FIG. 9 by line 908), includes the sum of leaks represented by line 902, a BPCS function (function of interest) represented by line 904, and an SIL function represented by line 906. As shown, line 908 lags in returning to only leak flow at about 104 seconds after both the BPCS function flow and SIL function flow terminate.

Figure 10:
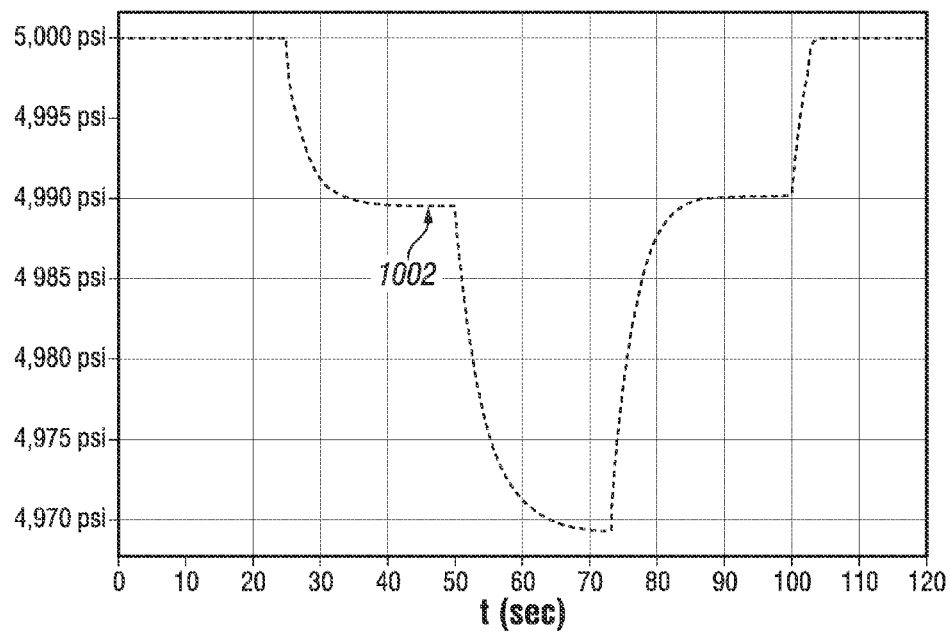
FIG. 10 is a graph representing pressure registered at the surface throughout one embodiment of a simulation of a system and method of the present disclosure.

FIG. 10 is a graph representing pressure registered on the surface throughout one embodiment of a simulation of a system and method of the present disclosure. Line 1002 shows a decrease in line pressure for the embodiment of the simulation represented in FIG. 9. As total flow increases, the line pressure decreases. Such changes in line pressure and flow can be measured in some embodiments by meters such as meters 214, 216 shown in the embodiment of FIG. 2.

Figure 11:
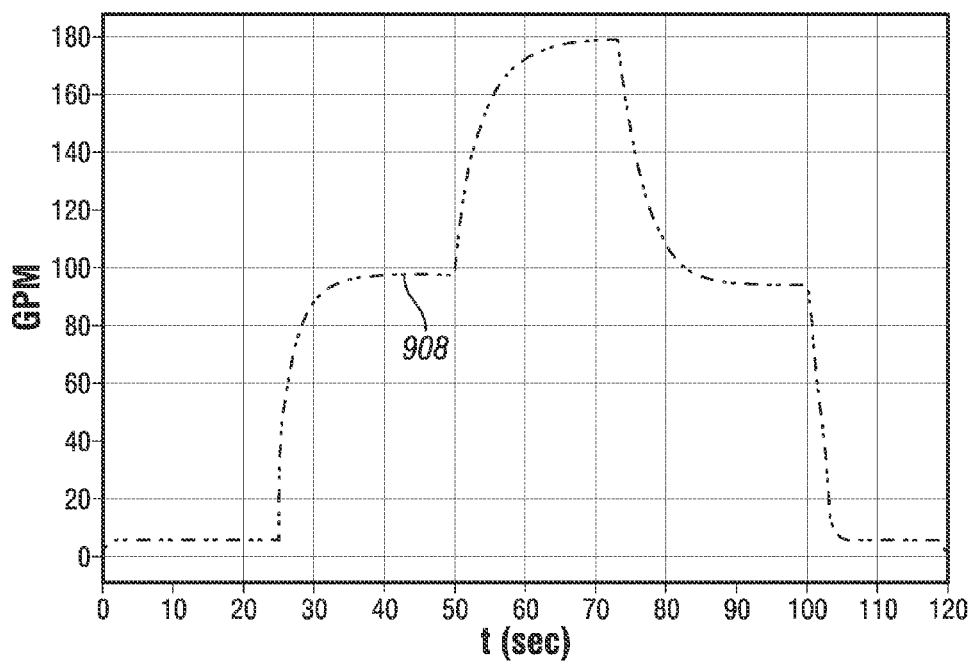
FIG. 11 is a graph representing flow registered at the surface throughout one embodiment of a simulation of a system and method of the present disclosure.

FIG. 11 is a graph representing flow rate registered on the surface throughout one embodiment of a simulation of a system and method of the present disclosure. Line 908 shows an increase in flow for the embodiment of the simulation represented in FIG. 9. As total flow increases, the line pressure decreases (shown in FIG. 10). Such changes in line pressure and flow can be measured in some embodiments by meters such as meters 214, 216 shown in the embodiment of FIG. 2. In some embodiments, a combination of aggregate pressure and flow measurements are used together to accurately gauge hydraulic flow to components of a BOP stack in a BOP system. Once again, the embodiments of systems and methods simulated herein are simulated by MATLAB®, however, other commercial software can be used in combination with hardware to implement the systems and methods. Referring to FIGS. 10 and 11, since the pressure and flow curves are inverted shapes, the hydraulic impedance (P/F) is constant for any given situation.

Figure 12:
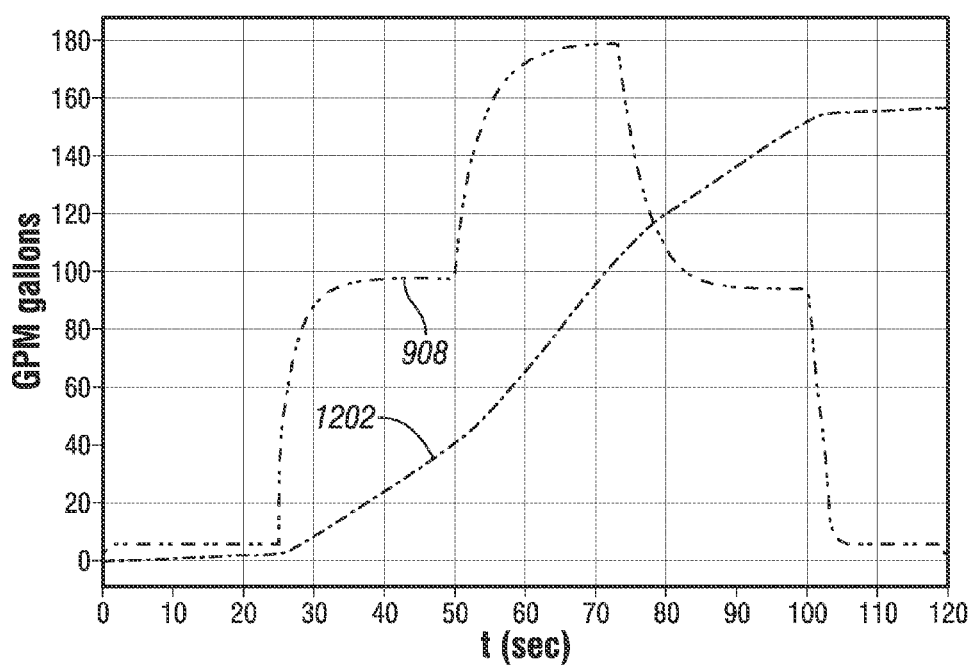
FIG. 12 is a graph showing gallons per minute (GPM) and total gallons flowed over time in one embodiment of a simulation of a system and method of the present disclosure.

FIG. 12 is a graph showing GPM and total gallons flowed over time in one embodiment of a simulation of a system and method of the present disclosure. Line 908 shows the total flow in GPM from the embodiment of the simulation described in FIG. 9. Within the simulation, an integration function can be provided. Line 1202 represents the total number of gallons that have flowed over time to a BOP stack, and this line is calculated by integrating the total flow rate over time.

Figure 13:
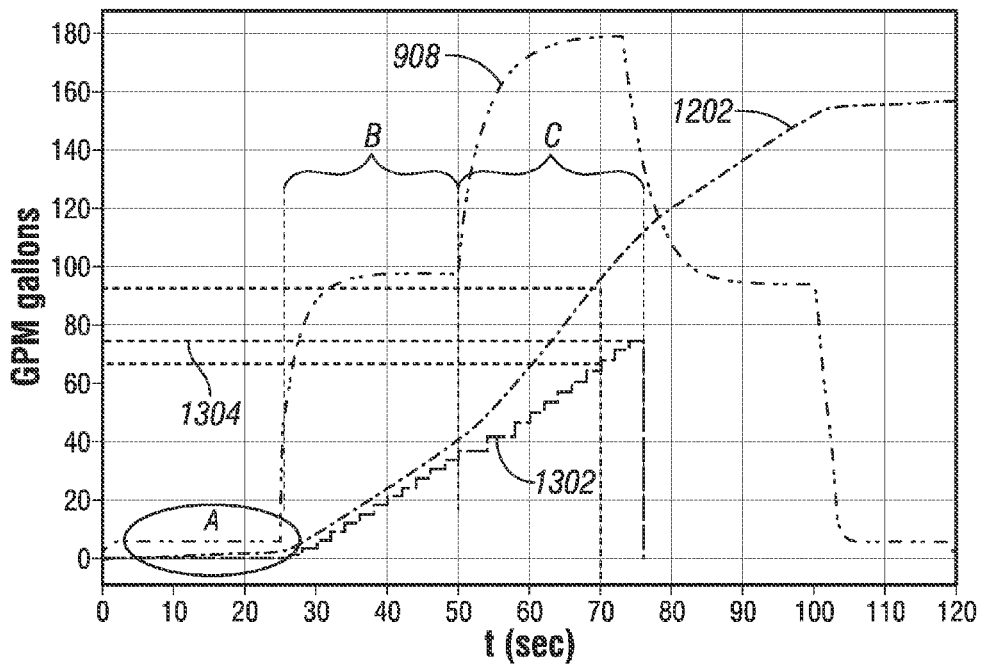
FIG. 13 is a graph showing the results of using a system and method of the present disclosure to remove from an aggregate flow a leak flow and flow from a second BOP function to obtain an accurate reading of the flow used to carry out a first BOP function.

FIG. 13 shows the results of using a system and method of the present disclosure to remove from aggregate flow a leak flow and a second function's flow to obtain the hydraulic flow to a first function of interest, also called a BPCS function. As discussed with regard to FIG. 9, line 908 represents the total flow from the surface to a BOP stack. Line 908 represents the sum of the flows of lines 902 (leaks), line 904 (function of interest), and line 906 (an SIL function). In a BOP system, such as BOP system 200, the total flow registered on the surface, such as by meter 214 (represented in FIG. 9 by line 908), includes the sum of leaks represented by line 902, BPCS (function of interest) represented by line 904, and SIL represented by line 906. Line 1202 represents the total number of gallons that have flowed over time to a BOP stack, and this line is calculated by integrating the total flow rate over time.

Still referring to FIG. 13, stepped line 1302 represents a state machine algorithm, similar to that described in FIG. 6, compensating for flows it needs to ignore. For example, in the embodiment of FIG. 13, the values of interest might be (1) the flow in GPM to the BPCS (function of interest) and/or (2) the total flow in gallons that have gone to the BPCS (function of interest) over time. In region A of FIG. 13, prior to 25 seconds, line 908 represents leakage in GPM. Line 1202 in this region, as the integration function, represents the total leakage in gallons at a given time. As the leak accumulates in the integration function (line 1202), the state machine algorithm ignores it, shown by line 1302 remaining at 0 GPM and diverging from line 1202. In other words, a BOP system, such as BOP system 200 in FIG. 2, should not count leakage toward a total amount of hydraulic fluid needed to carry out a given function.

In region B of FIG. 13, between 25 seconds and 50 seconds, line 908 for the total flow measured in the system includes the flow from leaks and the BPCS function. The BPCS function is activated at 25 seconds. In this region, line 1202 for integrated total flow and line 1302 for the state machine algorithm are offset by the amount of the leakage, but have about the same slope. At 50 seconds, an SIL function, also called a second function, is activated. Thus in region C, between about 50 seconds and about 76 seconds, line 908 represents the total flow for leakage in the system, plus flow for the BPCS function, and flow for the SIL function. While line 1202 continues to aggregate total flow in region C, line 1302 shows that the state machine function algorithm is ignoring the flow from the second SIL function. The state machine algorithm is calculating the flow going to the BPCS function by removing flow from leaks and the SIL function by using measurements provided by a flow meter and a pressure meter, as described with regard to the variable K in FIG. 6.

For example, at 70 seconds in region C, line 1302 for the state machine algorithm shows that the total flow having gone to the BPCS function is about 68 gallons. The state machine algorithm does not count the leakage of the system and the flow from the SIL function. At 70 seconds in region C for line 1202, the total flow aggregator, this shows the total flow is about 95 gallons. This would include the flow caused by leakage, the flow from the first BPCS function, and the flow from the second SIL function. Thus, line 1302 for the state machine algorithm provides an accurate reading of the total flow going to a function of interest, and discounts other flow sources, such as leaks or secondary functions.

In application, values of interest include when a BOP function has been executed, or in other words when a sufficient amount of hydraulic fluid has been provided to carry out the function. For example, line 1304 shows that line 1302 for the state machine algorithm reaches about 73 gallons at about 76 seconds. However, based on line 1202 for the integration of the total flow, about 76 gallons is reached at about 62 seconds. Thus, the state machine algorithm provides an accurate measure of when a function is accomplished by providing an accurate measure of the relevant total hydraulic flow to a function of interest.

Figure 14:
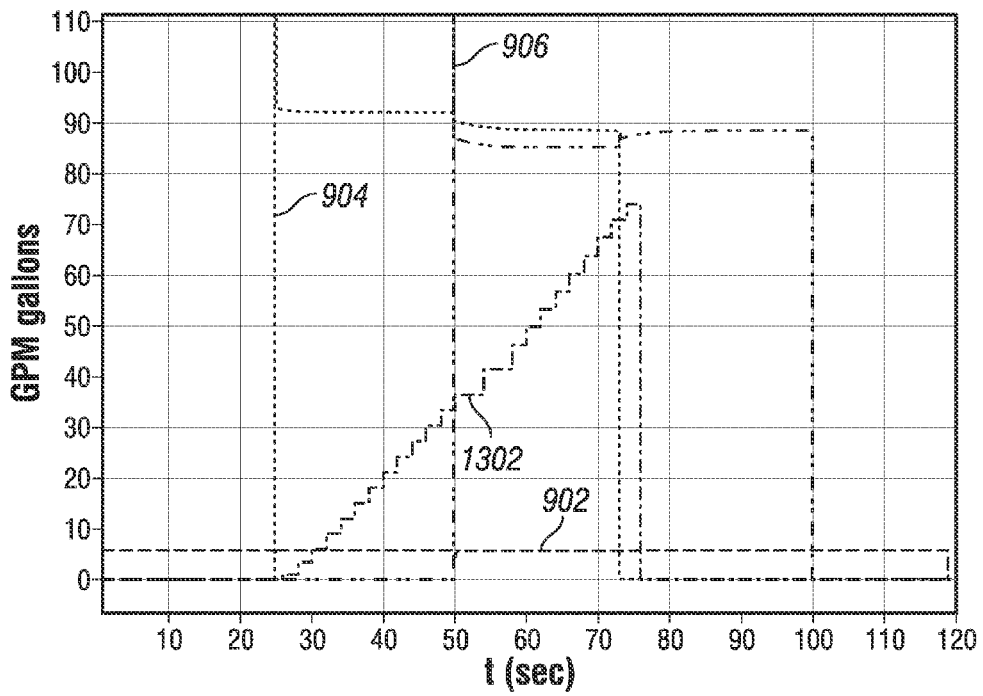
FIG. 14 is a graph showing the results of using a system and method of the present disclosure to remove from an aggregate flow a leak flow and flow from a second BOP function to obtain an accurate reading of the flow used to carry out a first BOP function.

FIG. 14 is a graph showing the results of using a system and method of the present disclosure to remove from an aggregate flow a leak flow and flow from a second BOP function to obtain an accurate reading of the flow used to carry out a first BOP function. At 25 seconds, the state machine algorithm represented by line 1302 starts calculating the total volume of accumulated flow when the BPCS function is activated. Lines similarly labeled represent the same lines from the previous figures.

Figure 15:
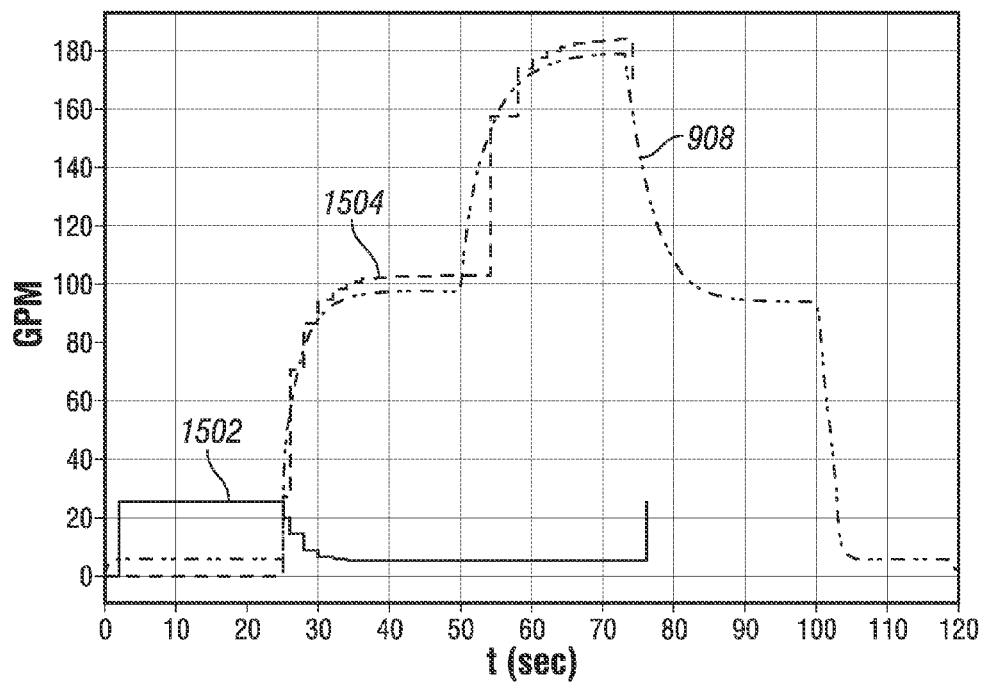
FIG. 15 is a graph showing the use of a flow rate compensator function in conjunction with a system and method of the present disclosure.

FIG. 15 is a graph showing the results of using a system and method of the present disclosure to remove from an aggregate flow a leak flow and flow from a second BOP function to obtain an accurate reading of the flow used to carry out a first BOP function. In FIG. 15, line 1502 represents a flow rate compensator function, such as a flow rate compensator function $S_2$ as described previously with regard to FIGS. 6 and 7. At 50 seconds when the SIL, second, function is activated, the rise time of line 908, representing the flow meter of a system gauging total flow, is slow due to the length of a rigid conduit, such as conduit 212 shown in system 200. In other words, there is a delay between the activation of a second function and the reading on a flow meter. Adding a flow rate compensator function, such as flow rate compensator function S2, provides rigid or straight-line transitions shown by line 1504, and this is advantageous in making state transitions.

Figure 16:
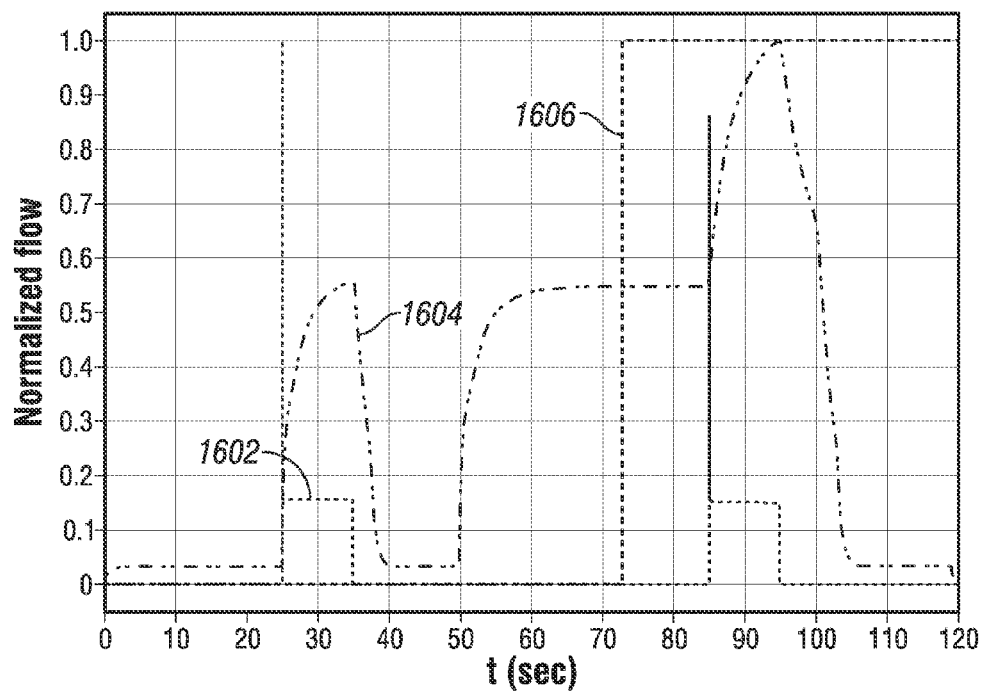
FIG. 16 shows a graph for the results of a faulty function being modeled in a system of the present disclosure.

FIG. 16 shows a graph for the results of a faulty function being modeled in a system of the present disclosure. FIG. 16 represents an experimental simulation in which a BPCS timing driver was altered to turn off a valve at an incorrect time. The graph is normalized to show all results. Line 1602 represents a faulty function, line 1604 represents a total flow rate, and line 1606 represents an error signal. The experiment shows that in some embodiments, a minimum acceptable flow rate during the time a function is fired needs to be added. Additionally, in some embodiments, a maximum flow rate is added for a function to trap fault cases that occur due to high flow rate, such as, for example, a hose blowing off of a fitting.

Figure 17:
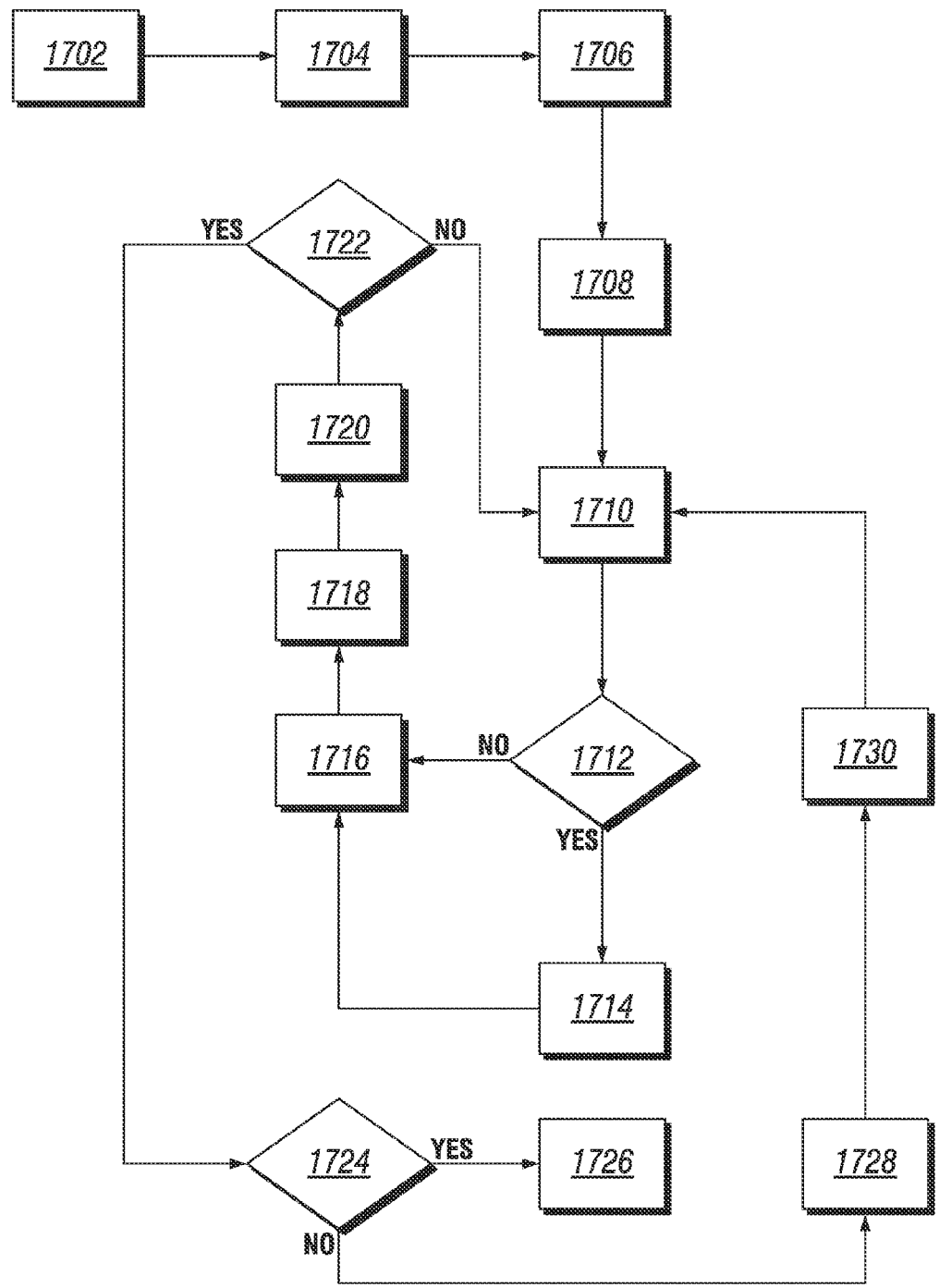
FIG. 17 provides one embodiment for a decision tree representing the program logic for systems and methods of the present disclosure.

FIG. 17 provides one embodiment for a decision tree representing the program logic for systems and methods of the present disclosure. In a BOP system, such as BOP system 200, only one aggregate flow meter and one aggregate pressure meter are provided. In FIG. 17, S represents allowable flow step change, t represents time, K represents "hydraulic resistance," P represents pressure, F represents flow rate, and A represents accumulated volume. At the beginning, step 1702, A=0. At step 1704, a first flow $F_1$ is measured and a first pressure $P_1$ is measured. At step 1706, a value for K is calculated where $K=P_1/F_1$. At step 1708, a BOP function is activated. At step 1710, a second flow measurement $F_2$ is measured and a second pressure measurement $P_2$ is measured. At step 1712, the logic checks if A=0. If yes, at step 1714 an initial flow Fi is stored and $Fi=F_2-(P_2/K)$. After step 1714, the process proceeds to step 1716.

If at step 1712 A does not equal zero, then at step 1716 the following is calculated: $A=A+(F_2-P_2/K)*t$. At step 1718, a third flow rate $F_3$ is measured. At step 1720, a ΔF is calculated for a change in flow rate as follows: $\Delta F=F_3-F_2$. At step 1722, if |ΔF|>S then the decision tree proceeds to step 1724. If |ΔF| is not greater than S, then the decision tree returns to step 1710. At step 1724, if A is complete, or in other words the accumulated volume reaches a desired accumulated volume, then the decision tree is complete at step 1726. If the accumulated volume has not reached a desired accumulated volume, or A is not complete, then the decision tree turns to step 1728, at which a fourth value for flow $F_4$ and a fourth value for pressure $P_4$ are read. At step 1730, K is once again calculated according to $K=P4/(F_4-Fi)$. After step 1730, the decision tree returns to step 1710, and the logic is carried out until A is complete, or the desired accumulated volume has been attained.

In the various embodiments of the disclosure described, a person having ordinary skill in the art will recognize that various types of memory are readable by a computer, such as the memory described in reference to the various computers and servers, e.g., computer, computer server, web server, or other computers with embodiments of the present disclosure.

The singular forms "a," "an," and "the" include plural referents, unless the context clearly dictates otherwise.

Examples of computer-readable medium can include but are not limited to: one or more nonvolatile, hard-coded type media, such as read only memories (ROMs), CD-ROMs, and DVD-ROMs, or erasable, electrically programmable read only memories (EEPROMs); recordable type media, such as floppy disks, hard disk drives, CD-R/RWs, DVD-RAMs, DVD-R/RWs, DVD+R/RWs, flash drives, memory sticks, and other newer types of memories; and transmission type media such as digital and analog communication links. For example, such media can include operating instructions, as well as instructions related to the systems and the method steps described previously and can operate on a computer. It will be understood by those skilled in the art that such media can be at other locations instead of, or in addition to, the locations described to store computer program products, e.g., including software thereon. It will be understood by those skilled in the art that the various software modules or electronic components described previously can be implemented and maintained by electronic hardware, software, or a combination of the two, and that such embodiments are contemplated by embodiments of the present disclosure.

In the drawings and specification, there have been disclosed embodiments of methods, systems, and non-transitory computer-readable medium having stored computer programs of the present disclosure, and although specific terms are employed, the terms are used in a descriptive sense only and not for purposes of limitation. The embodiments of methods, systems, and non-transitory computer-readable medium having stored computer programs of the present disclosure have been described in considerable detail with specific reference to these illustrated embodiments. It will be apparent, however, that various modifications and changes can be made within the spirit and scope of the embodiments of methods, systems, and non-transitory computer-readable medium having stored computer programs of the present disclosure as described in the foregoing specification, and such modifications and changes are to be considered equivalents and part of this disclosure.

The invention claimed is:

1. A method for accurately measuring and monitoring accumulated volume of hydraulic fluid in a blowout preventer (BOP) system, the method comprising the steps of:
   initializing a state machine algorithm, the state machine algorithm responsive to a BOP function of interest being activated;
   measuring an initial hydraulic flow rate baseline and an initial pressure baseline to create a hydraulic impedance variable for use in the state machine algorithm;
   monitoring an aggregate hydraulic flow rate and pressure of the BOP system over time;
   applying the hydraulic impedance variable to negate BOP system hydraulic flows not related to the BOP function of interest; and
   applying the state machine algorithm to determine when the BOP function of interest has been completed responsive to a total accumulated volume of hydraulic fluid.

2. The method according to claim 1, further comprising the step of operating the state machine algorithm to integrate the aggregate hydraulic flow rate over time to obtain a total accumulated flow volume.

3. The method according to claim 1, further comprising the step of modeling surface hydraulics of the BOP system, wherein the surface hydraulics are selected from the group consisting of: a hydraulic power unit; a rigid conduit; a hydraulic reservoir; and a pressure meter disposed proximate the HPU.

4. The method according to claim 1, further comprising the step of modeling subsea hydraulics of the BOP system, wherein the subsea hydraulics are selected from the group consisting of: a valve that supplies hydraulic fluid to the function of interest; a signal that opens and closes a hydraulic fluid supply valve for modeling purposes; a sync signal for the function of interest; and a supply of hydraulic fluid from surface hydraulics.

5. The method according to claim 1, further comprising the step of setting a maximum allowable change in hydraulic flow per unit time in the BOP system.

6. The method according to claim 1, wherein the BOP system hydraulic flows not related to the BOP function of interest are selected from the group consisting of: hydraulic flows from leaks in the BOP system and hydraulic flows related to ancillary BOP functions.

7. The method according to claim 1, further comprising the step of operating the state machine algorithm to determine a fault state, wherein the fault state is responsive to the BOP function of interest failing responsive to elapsed time from the BOP function of interest being activated.

8. The method according to claim 1, further comprising the step of applying a flow rate compensator function to make state transitions.

9. The method according to claim 1, further comprising the step of applying a minimum acceptable flow rate and a maximum acceptable flow rate during the time the BOP function of interest is activated.

10. The method according to claim 1, wherein the function of interest is a basic process control system function and the BOP system hydraulic flows not related to the BOP function of interest are a safety integrity level function and BOP system hydraulic leaks.

11. A system for accurately measuring and monitoring accumulated volume of hydraulic fluid in a blowout preventer (BOP) function of interest, the system comprising:
   surface hydraulics components, the surface hydraulics components comprising a hydraulic power unit (HPU) and at least two control systems, the at least two control systems fluidly coupled to the HPU and independently operable to cause flow of a hydraulic fluid from the HPU;
   subsea BOP components, the subsea BOP components comprising a BOP stack, wherein the BOP stack comprises BOP stack functions that are operable to be carried out by the flow of the hydraulic fluid from the HPU;
   a fluid flow meter disposed between the HPU and the BOP stack on a rigid conduit, the fluid flow meter operable to measure an aggregate flow of hydraulic fluid from the HPU to the BOP stack;
   a pressure meter disposed proximate the HPU, the HPU feeding hydraulic fluid to the rigid conduit, the pressure meter operable to measure line pressure of the aggregate flow of the hydraulic fluid from the HPU to the BOP stack;
   a processing unit, operable to carry out a method comprising the steps of:
      initializing a state machine algorithm, the state machine algorithm responsive to the BOP function of interest being activated;
      applying a measured initial hydraulic flow rate baseline and an initial pressure baseline to create a hydraulic impedance variable for use in the state machine algorithm;
      monitoring the aggregate flow of hydraulic fluid from the HPU to the BOP stack and the line pressure of the aggregate flow of the hydraulic fluid from the HPU to the BOP stack over time;
      applying the hydraulic impedance variable to negate BOP system hydraulic flows not related to the BOP function of interest; and
      applying the state machine algorithm to determine when the BOP function of interest has been completed responsive to a total accumulated volume of hydraulic fluid.

12. The system according to claim 11, wherein the method further comprises the step of operating the state machine algorithm to integrate the aggregate flow of the hydraulic fluid from the HPU to the BOP stack over time to obtain a total accumulated flow volume.

13. The system according to claim 11, wherein the method further comprises the step of modeling surface hydraulics of the BOP system, wherein the surface hydraulics are selected from the group consisting of: the HPU; the rigid conduit; a hydraulic reservoir; the pressure meter; and the fluid flow meter.

14. The system according to claim 11, wherein the method further comprises the step of modeling subsea hydraulics of the BOP system, wherein the subsea hydraulics are selected from the group consisting of: a valve that supplies hydraulic fluid to the function of interest; a signal that opens and closes a hydraulic fluid supply valve for modeling purposes; a sync signal for the function of interest; and the flow of the hydraulic fluid from the HPU.

15. The system according to claim 11, wherein the method further comprises the step of setting a maximum allowable change in hydraulic flow per unit time in the BOP system.

16. The system according to claim 11, wherein the BOP system hydraulic flows not related to the BOP function of interest are selected from the group consisting of: hydraulic flows from leaks in the BOP system and hydraulic flows related to ancillary BOP functions.

17. The system according to claim 11, wherein the method further comprises the step of operating the state machine algorithm to determine a fault state, wherein the fault state is responsive to the BOP function of interest failing based on elapsed time from the BOP function of interest being activated.

18. The system according to claim 11, wherein the method further comprises the step of applying a flow rate compensator function to make state transitions.

19. The system according to claim 11, wherein the method further comprises the step of applying a minimum acceptable flow rate and a maximum acceptable flow rate during the time the BOP function of interest is activated.

20. An apparatus comprising a tangible, non-transitory memory medium having a set of instructions stored thereon which when executed by a suitable processing unit cause the processing unit to perform a method comprising the steps of:
   initializing a state machine algorithm, the state machine algorithm responsive to a BOP function of interest being activated;
   applying a measured initial hydraulic flow rate baseline and an initial pressure baseline to create a hydraulic impedance variable for use in the state machine algorithm;
   monitoring aggregate flow of hydraulic fluid from an HPU to a BOP stack and line pressure of the aggregate flow of the hydraulic fluid from the HPU to the BOP stack over time;
   applying the hydraulic impedance variable to negate BOP system hydraulic flows not related to the BOP function of interest; and
   applying the state machine algorithm to determine when the BOP function of interest has been completed responsive to a total accumulated volume of hydraulic fluid.

* * * * *